Jan. 28, 1969  J. E. BARTLETTI  3,423,867
ICE-FISHING RIG

Filed June 15, 1967  Sheet 1 of 2

INVENTOR
JOHN E. BARTLETTI
BY
John W. Winter
ATTORNEY

Jan. 28, 1969    J. E. BARTLETTI    3,423,867
ICE-FISHING RIG

Filed June 15, 1967    Sheet 2 of 2

INVENTOR
JOHN E. BARTLETTI
BY
John M. Winter
ATTORNEY

United States Patent Office 3,423,867
Patented Jan. 28, 1969

3,423,867
ICE-FISHING RIG
John E. Bartletti, Antigo, Wis., assignor of one-half to Glenn R. Risdon
Filed June 15, 1967, Ser. No. 646,305
U.S. Cl. 43—17
Int. Cl. A01k 97/12
5 Claims

ABSTRACT OF THE DISCLOSURE

Apparatus for ice-fishing comprising a reel enclosed within a housing and having foldable legs for supporting the housing over a hole in the ice. A magnet in the lid cooperates with the movable line guide of the reel to maintain the hinged lid in its horizontal closed position. When a fish is hooked and begins to unwind the fish line from the reel, the double acting worm gear moves the line guide laterally and releases the lid which is swung into an upright position by a spring.

The housing has an aperture in the bottom thereof through which the fishing line extends. A tubular element is emplaced in the aperture and absorbent material soaked with anti-freeze is positioned in the tubular member for wiping the fishing line with anti-freeze as it passes therethrough.

A flexible gripping handle is attached to one side of the housing for holding the rig while reeling in a fish.

BACKGROUND OF THE INVENTION

Field of the invention

Ths invention relates to a reel-type ice-fishing rig which signals the hooking of a fish.

Description of the prior art

Ice-fishermen enjoy a reputation as being a very ingenious group because of the many innovations they have developed to increase their efficiency as fishermen and enjoyment of their sport. In spite of the many developments in this field, there remains a need for a reel-type ice-fishing rig which will remain efficient and trouble free under even the most adverse weather conditions.

In the known devices, the unprotected reels and line often become frozen and unmanageable and signaling devices frequently fail particular in inclement weather.

SUMMARY OF THE INVENTION

My invention basically comprises an ice-fishing rig having a reel mounted in a closed housing for protection from the elements. The housing has a hinged lid which is held shut by magnetic attraction for the laterally movable line guide. When a fish is hooked and takes the bait, the reel unwinds and the line guide moves laterally out of the magnetic field whereby the spring swings open the lid thus signaling the strike.

The fishing line extends through a short tubular member in the bottom of the enclosure wherein it is wiped with anti-freeze solution as it is reeled into the closed housing to prevent it from freezing on the reel and becoming otherwise unmanageable. The reel and line wound thereon are thus both protected against freezing and other adverse conditions.

Furthermore, the apparatus is supported on folding legs over the hole in the ice and is provided with a flexible handle so that when the fisherman grasps the handle and lifts the apparatus off of its supporting legs the apparatus will have simulated pole action to prevent the fish from breaking the line.

Other features and advantages of my invention will be apparent from the following detailed description taken in conjunction with the accompanying drawings wherein a preferred embodiment of the principles of the invention has been selected for exemplification.

DESCRIPTION OF THE PREFERRED EMBODIMENT

Figure 1:
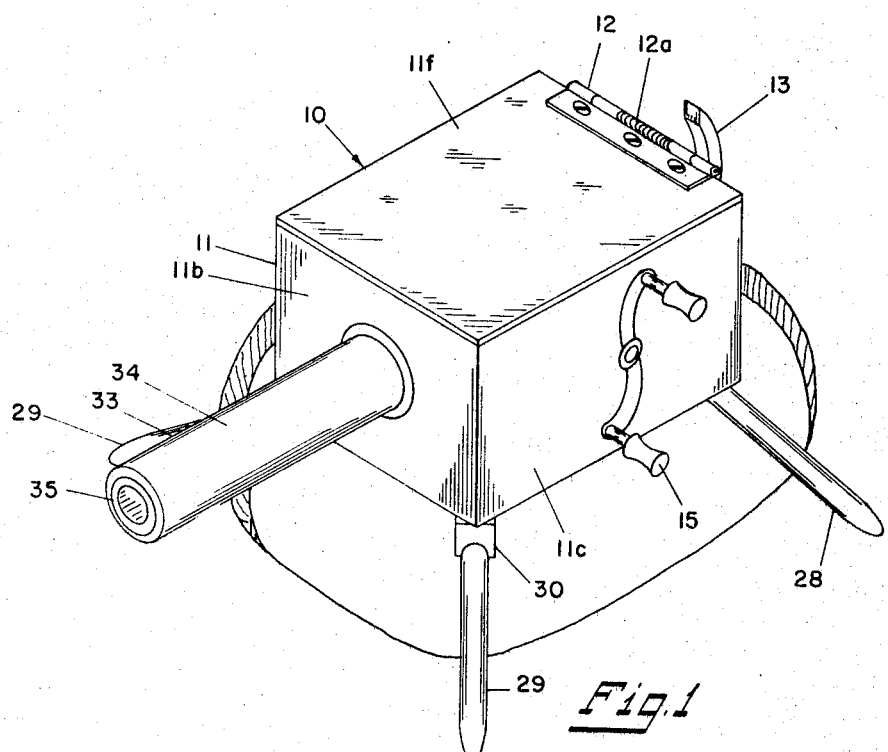
FIGURE 1 is a perspective view of my ice-fishing rig supported over a hole in the ice.
Figure 3:
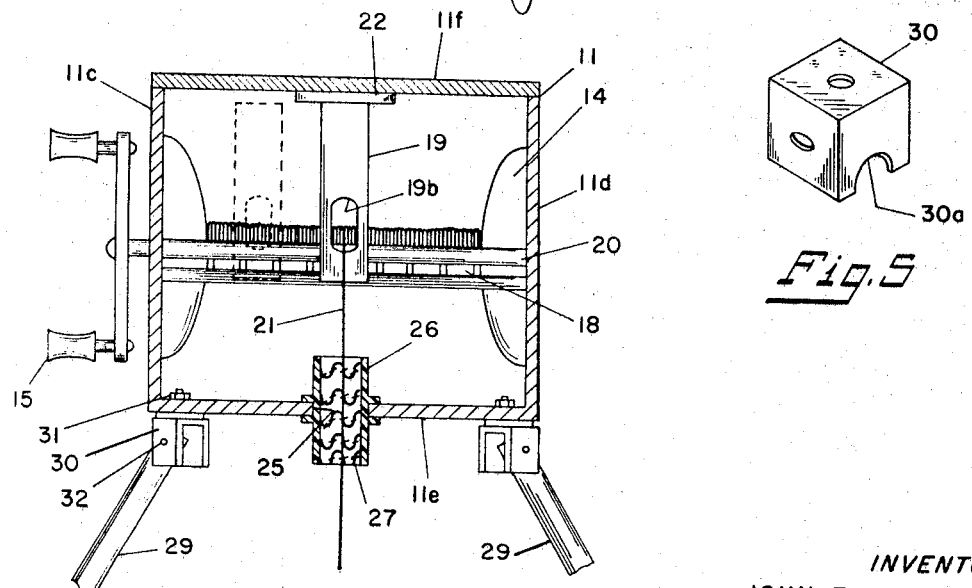
FIGURE 3 is a cross-sectional view taken along line 3—3 of FIGURE 2.
Figure 5:
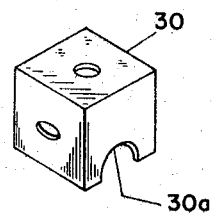
FIGURE 5 is a perspective of the attachment channel for the folding legs.
Figure 2:
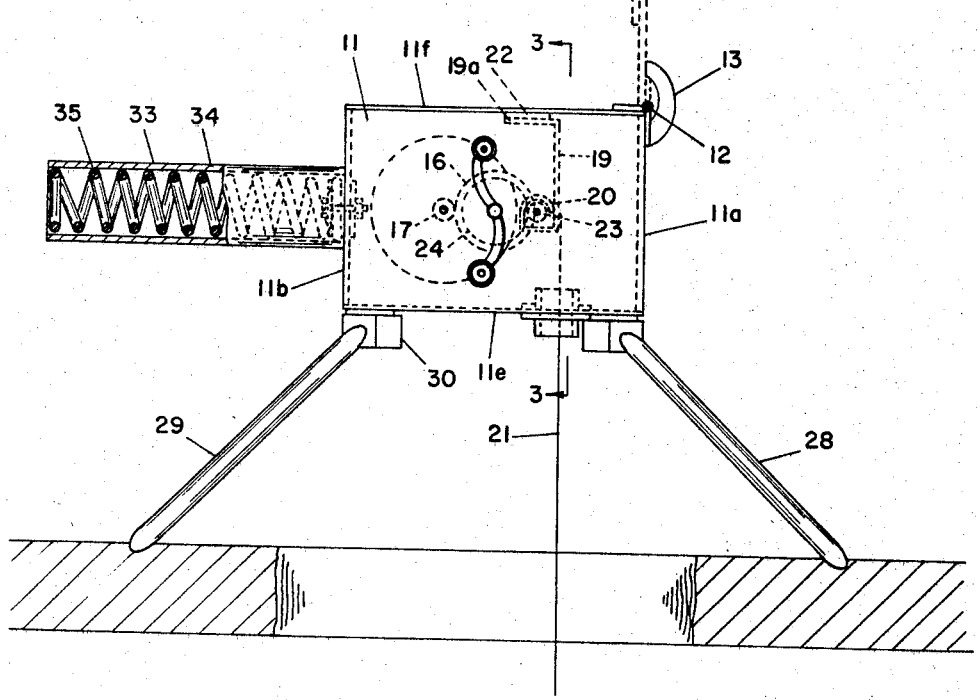
FIGURE 2 is a side elevation view of the ice-fishing rig shown in FIGURE 1 with parts thereof broken away and other parts in dashed lines and with the lid shown in open position in dashed lines.

Referring now more particularly to the drawings, my ice-fishing rig is generally shown at 10 in FIGURE 1 supported over a hole in the ice. As shown in FIGS. 1–3, the rig 10 comprises a substantially rectangular housing 11 having front and back sides 11a and 11b, left and right sides 11c and 11d, and a bottom 11e. The housing is substantially rectangular and has a lid 11f attached to the front side 11a by a hinge 12 for pivotal movement between a substantially horizontal closed position shown in full lines in FIGURE 2 and a substantially upright open position shown in dashed lines. A stop 13 is mounted on front side 11a to prevent the lid from swinging beyond a vertical position. As shown in FIGURE 1, the hinge has a spring 12a incorporated therewith in the well-known manner for urging the lid towards its open position.

A reel 14 is mounted in the side walls 11c and 11d of the housing and a crank handle 15 is provided on side 11c of the housing for turning the reel 14. As shown in dashed lines in FIGURE 2, the crank arm has a relatively large gear 16 associated therewith for driving a substantially smaller gear 17 on the reel for turning the reel whereby the reel is rotated substantially faster than the crank handle. As best shown in FIGURE 3, a two-way worm gear 18 is rotatably mounted in the side walls for moving a line guide 19 laterally across the front of the reel as the reel rotates. The two-way worm gear is covered by a channel-shaped member 20 over which the fishing line 21 extends. The channel-shaped member and the two-way worm gear are of conventional construction; however, the line guide extends upwardly substantially farther than a line guide of known construction and has a substantially horizontal steel portion 19a extending rearwardly from its upright portion.

As best shown in FIGURES 2 and 3, when the line guide is in its substantially central position its horizontal top portion 19a extends under a magnet 22 attached to the underside of the lid 11f. The attraction of the magnet for the horizontal top portion of the line guide holds the lid 11f in its closed position, overcoming the force of the spring 12a which is urging the lid toward its open position shown in dotted lines in FIGURE 2. A toothed gear 23 mounted on the end of worm gear 18 is driven by a second toothed gear 24 on crank handle 15.

The bottom 11e of the housing has an aperture 25 therein and has a flanged rubber tubular member 26 secured in the aperture 25. The fishing line extends through the tubular member 26 down through the hole in the ice. Absorbent material 27 such as cotton or the like is positioned in the tubular member 26 and is soaked with an anti-freeze solution so that as the line is reeled into the housing the absorbent material wipes the line and applies anti-freeze thereto so that the line does not become frozen on the reel or otherwise unmanageable.

Figure 4:
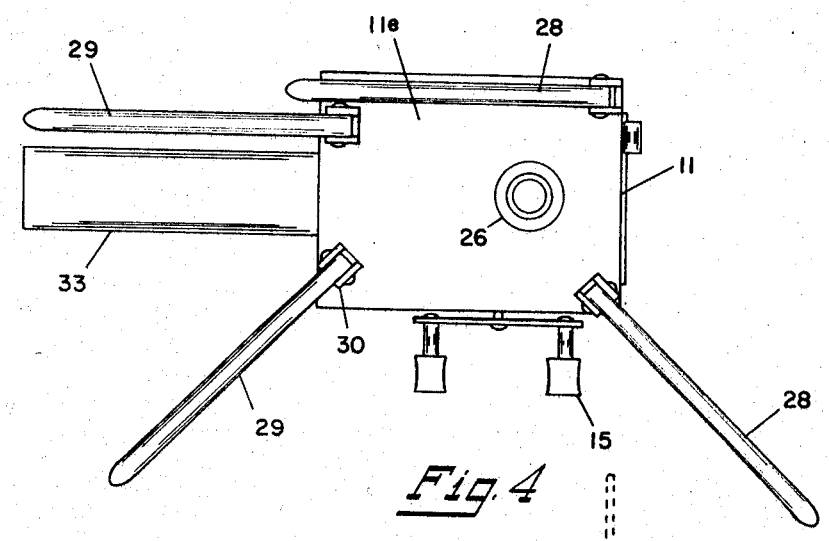
FIGURE 4 is a bottom view of my fishing rig with two legs in supporting position and the other two legs in folded position.

The housing 11 is supported over the fishing hole by a pair of front legs 28 and a pair of rear legs 29. The legs have a substantially square connecting channel 30 pivotally secured to the bottom 11e of the housing by bolts 31. One side of the connecting channel is open and the opposite side has a substantially semi-circular opening 30a therein. The legs may be formed of any suitable rigid materials such as aluminum, wood, or the like. The legs are pivotally pinned in the channels by pivot pins 32. As best seen in FIGURE 4, the front pair of legs 28 are attached at the corners of the bottom of the housing and the rear pair of legs 29 are pivotally attached slightly inwardly of the forward legs so that the legs may be folded into a substantially parallel position with the bottom of the housing for transporting and storage. In order to fold the legs they are swung out of the semi-circular opening 30a in the one side of the connecting channel and into the open side. When the apparatus is to be set up over a hole in the ice, the legs are pivoted downwardly and are swung into the semi-circular recess 30a in the opposite side of their connecting channel and are thus supported in a flared position shown in the drawings.

A flexible handle 33 in the form of a tubular rubber member 34 supported by a coil spring 35 is attached to the rear side 11b of the housing by suitable means. When the rig 10 is supported by grasping the handle 33 and lifting the apparatus upwardly, the flexible handle will provide some pole action or flexibility to the apparatus so that a large fish will not break the fishing line.

The operation of my fishing apparatus is readily apparent from the drawings. To set up my fishing rig the fishing line of the reel is threaded through the aperture 19b in the line guide and then downwardly through the tubular member 26 in the bottom of the housing. After a hook and bait are attached to the line the line is then dropped through the hole in the ice down to the desired depth. The line guide should be substantially centered in the housing as shown in FIGURE 3 and the lid is then closed. The lid will be held in this closed position by the magnetic attraction of the magnet 22 for the substantially horizontal portion 19a of the line guide.

When a fish strikes and begins to take bait, the fishing line is unwound from the reel and the turning of the reel causes the worm gear 18 to rotate and move the line guide 19 laterally across the front of the reel as the line is unwound. As the line guide is moved laterally out of alignment with the magnet to a position as shown in dashed lines in FIGURE 3, the line guide is no longer in the magnetic field and the spring 12a causes the lid to be swung open into the upright position shown in dashed lines in FIGURE 2 thereby signaling the strike.

Although not shown in the drawings it is understood that a signaling light may be attached to the underside of the lid whereby the light goes on when the lid opens to facilitate signaling during the late hours of fishing.

When a strike is signaled the fisherman picks up the apparatus by grasping the flexible handle in his left hand and reels in the fish with his right hand operating the crank arm 15. The flexible gripping handle provides simulated pole action so that larger fish will not snap the fishing line.

I claim:
1. An ice-fishing rig comprising:
   (a) a substantially rigid housing having sides and a bottom, said bottom having an aperture therein for receiving a fishing line,
   (b) a lid hingedly connected to said housing for pivotable movement between a substantially horizontal closed position and a substantially upright open position,
   (c) spring means biasing said lid toward said open position,
   (d) a reel rotatably mounted in said housing,
   (e) an external crank handle on the side of said housing to rotate said reel for winding fishing line thereon,
   (f) a line guide mounted in said housing for movement laterally across said reel for distributing the fishing line evenly thereacross as the line is wound thereon,
   (g) latching means mounted on said lid for cooperation with said line guide to maintain said hinged lid in said closed position against the force of said spring means, and
   (h) means for laterally moving said line guide in response to the rotation of said reel so that said line guide is moved out of cooperation with said latching means when a fish unwinds the line from said reel whereby said spring means forces said lid into said substantially upright open position.

2. The fishing rig as specified in claim 1 wherein said latching means comprises a magnet mounted on said lid above a portion of the path of said guide means, said magnet having sufficient attraction for said line guide to maintain said hinged lid in said closed position against the force of said spring means.

3. The ice-fishing rig as specified in claim 1 including a flexible gripping handle attached to said housing for holding the rig while reeling in a fish.

4. The fishing rig as specified in claim 1 including foldable legs attached to said housing for supporting said housing over a hole in the ice.

5. The fishing rig as specified in claim 1 including a tubular member inserted in said aperture, whereby said fishing line passes through said tubular member, and wiping means for applying an anti-freeze solution to said fishing line as said line is drawn through said tubular member to keep the line from becoming frozen and unmanageable.

References Cited
UNITED STATES PATENTS

| 1,253,746 | 1/1918 | Teeling | 43—17 |
| 2,237,536 | 4/1941 | Wells. | |
| 2,618,091 | 11/1952 | Sheraski | 43—17 |

SAMUEL KOREN, *Primary Examiner.*

DANIEL J. LEACH, *Assistant Examiner.*